Patented Feb. 4, 1936

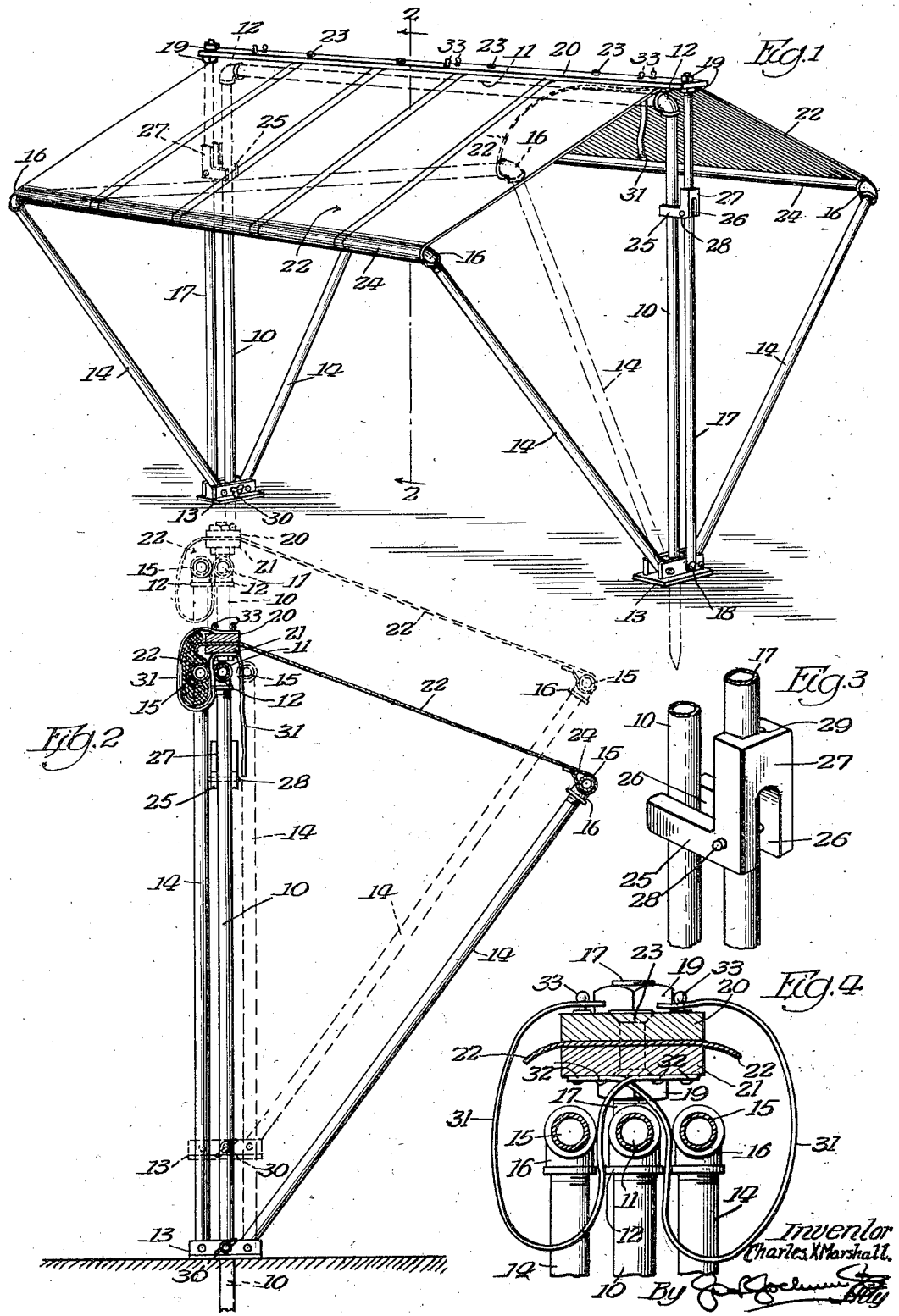

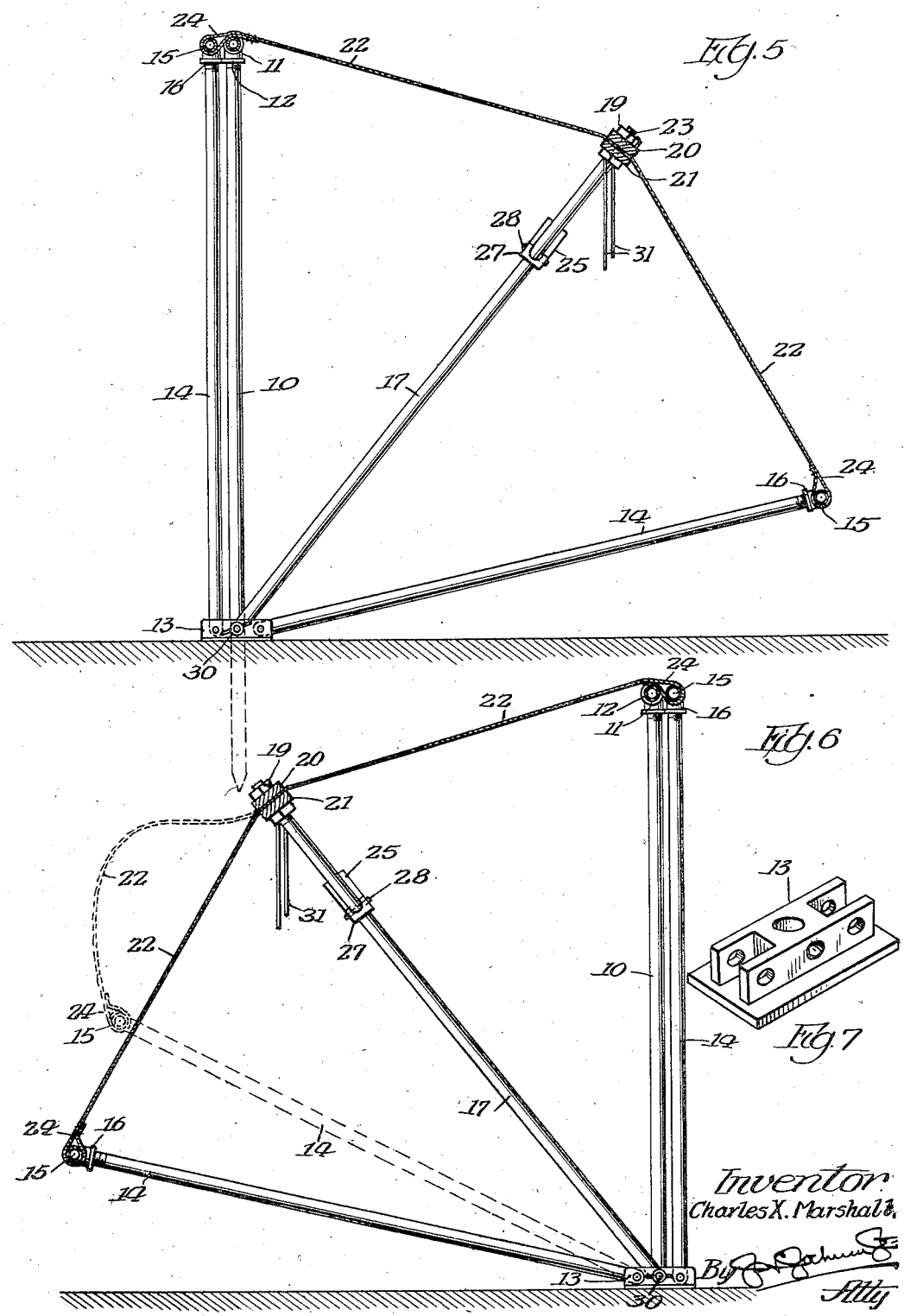

2,029,886

UNITED STATES PATENT OFFICE 2,029,886

LAWN CANOPY

Charles X. Marshall, Chicago, Ill.

Application July 13, 1935, Serial No. 31,242

17 Claims. (Cl. 135—7.1)

This invention relates to improvements in lawn canopies, and one of the objects of the invention is to provide an improved device of this character which may be readily adjusted so as to form a protection against the sun's rays according to the position of the sun, and which is also adapted to be so positioned as to form a protection from the wind.

A further object is to provide an improved device of this character so constructed that parts of the frame will yield with respect to other parts under the effect of wind, so as to prevent injury to the frame.

To the attainment of these ends and the accomplishment of other new and useful objects as will appear, the invention consists in the features of novelty, in substantially the construction, combination and arrangement of the several parts hereinafter more fully described and claimed and shown in the accompanying drawings illustrating this invention and in which Figure 1 is a perspective view of a device of this character constructed in accordance with the principles of this invention and also showing in dotted lines the position some of the parts will assume under the influence of wind.

Figure 2 is a view taken on line 2—2, Figure 1, showing one side of the awning reefed or folded up and also showing in dotted lines the manner in which the device may be vertically adjusted.

Figure 3 is a detail perspective view, showing one form of lock or retaining means.

Figure 4 is a detail sectional view, on an enlarged scale and with parts omitted, showing the manner of reefing or folding the awning.

Figure 5 is a sectional view as taken on line 2—2, Figure 1, showing the awning in one position different from that shown in Figure 1.

Figure 6 is a view similar to Figure 5, showing the awning in another position, and in dotted lines the position some of the parts will assume under the influence of wind.

Figure 7 is a perspective view of a base member for certain pivoted parts.

The device consists essentially of a main rigid supporting frame comprising uprights 10 and a cross bar 11 constructed of any desired or suitable material. The frame, however, is preferably constructed of piping with the upper ends of the uprights 10 connected by means of elbows 12 to the horizontal or cross bar 11. The lower ends of the uprights 10 are inserted in the ground either in a socket specially prepared for that purpose (not shown) or by being driven into the ground, or the uprights may be held in position in any manner so as to form a rigid frame.

Slidably mounted upon each of the uprights 10 is a base member 13 to each of which is pivotally connected one end of uprights 14. These uprights 14 may be of any desired length and the outer ends of co-operating uprights 14 are connected together by means of a cross bar 15, preferably through the medium of elbows or coupling members 16. The uprights 14 and the cross bars 15 may be constructed of any suitable material but preferably tubing of any desired diameter, and the ends of the uprights 14 together with the ends of the cross bars 15 are screwed into the respective elbows or couplings 16, not to the fullest extent of the screw threaded connection, but for a sufficient distance to form a union between these parts. This form of connection is desirable for the reason that the threaded ends of the uprights 14 and of the cross bar 15 are not threaded tightly into the couplings or elbows 16, so as to permit of a relative movement of these parts in a manner and for a reason to be set forth.

Additional uprights 17 are provided adjacent each of the uprights 10 and the lower ends of these uprights 17 are pivoted as at 18 respectively to the base members 13, preferably at points intermediate the points of pivotal connection of the uprights 14 with the base 13. These uprights 17 are of a height to extend above the cross bar 11, and disposed between the upper ends of the uprights 17 and connected thereto at opposite ends thereof, preferably by one end of the upright 17 passing therethrough and secured thereto by means of nuts or collars 19, is a cross bar or member 20. Arranged beneath the cross bar 20 and between the uprights 17 is another cross bar 21 which co-operates with the cross bar 20 to form a clamp for holding the central portion of a flexible member 22 and for securing the same to the uprights 17.

This flexible member 22 is constructed of any suitable material, such as fabric or the like and constitutes the top of the shade or awning. The clamp members 20 and 21 are secured together in any desired or suitable manner, such as by means of fastening devices 23 which pass through both of the clamp members and also through the top 22, whereby these parts will be permanently secured together. The flexible member 22 may be of any desired length and the outer edges thereof are secured respectively to the cross bars 15 in any suitable manner, preferably by forming loops or hems 24 at the ends of the member through which the rods or cross bars 15 are threaded.

The uprights 14 are preferably shorter than the uprights 10, and the uprights 17 so that when the parts are in the position shown in Figure 1, the flexible member 22 will be somewhat in the shape of a gable with the central portion higher than the outer edges, for a reason to be set forth.

The flexible member or cover 22 is held taut when the device is open for use, by the weight of the uprights 14 and the cross bars 15.

By reason of the loose connections between the ends of the uprights 14 and the cross bars 15 with the elbows or couplings 16, and when the parts are in the full line position as shown in Figure 1, and when the wind is blowing, should the air currents strike only one end of the shade or awning, that particular end will yield and the cross bars 15 and the uprights 14 will be moved relatively with respect to each other, as shown in dotted lines in Figure 1, so as to prevent injury to the parts.

The parts may be secured in the position shown in Figure 1 in any desired or suitable manner, preferably by means of clamping members of fastening devices 25, one of which may be secured to each of the uprights 17 to co-operate with each of the uprights 10. These clamping devices 25 are preferably provided with a bifurcated portion 26 and a body portion 27, and are pivotally mounted as at 28. A portion of the body 27 is preferably cut away as at 29 so as to receive the uprights 17 when the parts are in the position shown in Figure 3. The body portion 27 is preferably weighted so that gravity will hold the same either in a locking or unlocking position when the fastening device or catch has been adjusted.

The numeral 30 designates set screws or other fastening devices which may be provided on the base member 13, so that the entire shade or awning, with the exception of the frame formed by the members 10 and 11, may be vertically adjusted upon the uprights 10 as shown in dotted lines in Figure 2 to raise the top of the awning, and when so adjusted may be held in such position by adjustment of the set screws 30.

If desired, either one or both of the sides of the awning may be folded or reefed by swinging either one or the other pair of uprights 14 into contact with the uprights 19 and the flexible member 22 may then be folded and secured in its folded and collapsed condition by means of suitable straps or fastening members 31. The ends of the straps or members 31 may be secured as at 32 to the bottom of the member 21 beneath the flexible member 22. Pins or projections 33 may be provided to extend above the upper member 20 and over which pins 33 the ends of the straps or members 31 may be fastened preferably by passing the pins 33 through the openings in the ends of the straps.

Obviously any other suitable fastening means may be provided.

With this improved construction it will be manifest that when the parts are in the position shown in Figure 1, the entire awning or shade may be vertically adjusted upon the uprights 10 and secured in their adjusted position by fastening devices 30.

If desired, and when the parts are in the position shown in Figure 1, the shade or awning may be swung to either one side or the other with respect to the frame formed by the uprights 10 and cross bar 11, into either position shown in Figures 5 and 6, and at all times when the shade or awning is open, and in the event that wind should strike the top or flexible member 22 from beneath, the portions of the frames formed by the uprights 14 and cross bars 15 will yield with respect to each other, as shown in Figure 1, to prevent injury or damage to the structure.

It will also be manifest that when the canopy is in the position shown in Figures 5 or 6, it will serve as a protection against the wind and by reason of the gable formation of the top or canopy proper, and when the parts are in the position shown in Figures 5 or 6, more room will be provided so that a person beneath the awning will not strike his head against the top or member 22.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A lawn canopy embodying a rigid upright frame, uprights pivotally mounted at their lower ends on opposite sides of the said frame, a flexible member extending across and disconnected from the top of said frame and secured at its ends to the respective uprights and constituting the connection between the uprights on opposite sides of the frame whereby the flexible member will be moved across said frame when the said uprights are moved about their pivots to cause the flexible member to be moved from one side to the other side of the said frame.

2. A lawn canopy embodying a rigid upright frame, uprights disposed on opposite sides of the frame and pivotally mounted at their lower ends, a flexible member extending across and disconnected from the top of said frame and connected at its opposite ends to the respective said uprights, intermediate uprights disposed between the respective pairs of the first said uprights and pivotally mounted at their lower ends, means connecting the intermediate uprights, and means securing said flexible member intermediate its ends to the last said means, whereby when the said uprights are swung about their pivots the said flexible member may be moved substantially entirely from one side to the other side of said frame.

3. A lawn canopy embodying a rigid upright frame, uprights disposed on opposite sides of the frame and pivotally mounted at their lower ends, a flexible member extending across and disconnected from the top of said frame and connected at its opposite ends to the respective said uprights, intermediate uprights disposed between the respective pairs of the first said uprights and pivotally mounted at their lower ends, means connecting the intermediate uprights, means securing said flexible member intermediate its ends to the last said means, whereby when the said uprights are swung about their pivots the said flexible member may be moved substantially entirely from one side to the other side of said frame, and means for securing said intermediate uprights against movements about their pivots.

4. A lawn canopy embodying a rigid upright frame, uprights disposed on opposite sides of the frame and pivotally mounted at their lower ends, a flexible member extending across and disconnected from the top of said frame and connected at its opposite ends to the respective said uprights, intermediate uprights disposed between the respective pairs of the first said uprights and pivotally mounted at their lower ends, means connecting the intermediate uprights, means securing said flexible member intermediate its ends to the last said means, whereby when the said uprights are swung about their pivots the said flexible member may be moved substantially entirely from one side to the other side of said frame, and interengaging means between said intermediate uprights and said frame for maintaining the former against movement about their pivots.

5. A lawn canopy embodying a rigid upright frame, uprights disposed on opposite sides of the frame and pivotally mounted at their lower ends, a flexible member extending across and disconnected from the top of said frame and connected at its opposite ends to the respective said uprights, intermediate uprights disposed between the respective pairs of the first said uprights and pivotally mounted at their lower ends, means connecting the intermediate uprights, means securing said flexible member intermediate its ends to the last said means, whereby when the said uprights are swung about their pivots the said flexible member may be moved substantially entirely from one side to the other side of said frame, and means mounting said uprights for bodily adjustment in directions lengthwise thereof and with respect to said frame.

6. A lawn canopy embodying a rigid upright frame, supplemental frames disposed on opposite sides of the first said frame, said supplemental frames embodying uprights pivotally mounted at their lower ends, and a cross bar between the uprights of each of the supplemental frames and loosely connected thereto, a flexible member extending across and disconnected from the top of said frame and connected at its opposite ends to the respective said uprights, intermediate uprights disposed between the respective pairs of the said supplemental frames and pivotally mounted at their lower ends, means connecting the intermediate uprights, and means securing said flexible member intermediate its ends to the last said means, whereby when the said uprights are swung about their pivots the said flexible member may be moved substantially entirely from one side to the other side of said frame, the said loose connections between the uprights of the supplemental frames and their cross bars permitting the parts of the respective supplemental frames to move independently with respect to each other.

7. A lawn canopy embodying an upright rigid frame, a pair of uprights pivoted at their lower ends on opposite sides of and adjacent the base of the frame at each end thereof, uprights intermediate the first said uprights adjacent each end of the frame and pivotally mounted adjacent the base of the frame, said intermediate uprights being of a length to extend above the top of the frame, and a flexible member secured intermediate its ends to the said intermediate uprights, extending across the frame and connected with the uprights on opposite sides of the frame, said flexible member being held taut by the weight of the first said uprights, said uprights and flexible member constituting a unit adapted to be pivotally moved with respect to the said frame to move the flexible member substantially from one side to the other side of said frame.

8. A lawn canopy embodying an upright rigid frame, a pair of uprights pivoted at their lower ends on opposite sides of and adjacent the base of the frame at each end thereof, uprights intermediate the first said uprights adjacent each end of the frame and pivotally mounted adjacent the base of the frame, said intermediate uprights being of a length to extend above the top of the frame, and a flexible member secured intermediate its ends to the said intermediate uprights, extending across the frame and connected with the uprights on opposite sides of the frame, said flexible member being held taut by the weight of the first said uprights, said uprights and flexible member constituting a unit adapted to be pivotally moved with respect to the said frame to move the flexible member substantially from one side to the other side of said frame, the first said uprights adapted to contact said frame to limit the swinging movement of said unit with respect to the frame.

9. A lawn canopy embodying an upright rigid frame, uprights pivoted at their lower ends on opposite sides of and adjacent the base of the frame, uprights intermediate the first said uprights and adjacent the ends of the frame and pivotally mounted adjacent the base of the frame, said intermediate uprights being of a length to extend above the top of the frame, a flexible member secured intermediate its ends to the said intermediate uprights, extending across the frame and connected with the uprights on opposite sides of the frame, said flexible member being held taut by the weight of the first said uprights, said uprights and flexible member constituting a unit adapted to be pivotally moved with respect to the said frame to move the flexible member substantially from one side to the other side of said frame, and means for maintaining said unit against swinging movement.

10. A lawn canopy embodying an upright rigid frame, uprights pivoted at their lower ends on opposite sides of and adjacent the base of the frame, uprights intermediate the first said uprights and adjacent the ends of the frame and pivotally mounted adjacent the base of the frame, said intermediate uprights being of a length to extend above the top of the frame, a flexible member secured intermediate its ends to the said intermediate uprights, extending across the frame and connected with the uprights on opposite sides of the frame, said flexible member being held taut by the weight of the first said uprights, said uprights and flexible member constituting a unit adapted to be pivotally moved with respect to the said frame to move the flexible member substantially from one side to the other side of said frame, and interengaging means between said frame and certain of said uprights to maintain said unit against swinging movement.

11. A lawn canopy embodying a frame comprising uprights pivotally mounted at one end, a cross bar connecting the upper ends of said uprights, and a flexible member anchored at one end and secured at its other end to said cross bar whereby the said member will be held taut by the weight of said frame, the connections between said uprights and said cross bar being loose whereby when one of said uprights is maintained against movement about its pivot, the other of said uprights will be free to move about its respective pivot.

12. A lawn canopy embodying a rigid frame, uprights pivotally mounted by their lower ends on opposite sides of the frame, a flexible member extending across and being detached from the top of said frame and secured at its ends to the respective said uprights whereby the said member may be moved across the top of said frame substantially to one side or the other of the frame, said uprights being individually or collectively foldable against said frame, and means for maintaining said flexible member from movement across said frame when either one or both of the sets of uprights are folded or unfolded with respect to said frame.

16. A lawn canopy embodying a rigid upright frame, a supplemental frame comprising uprights pivotally mounted at their lower ends adjacent the base of the first said frame, said uprights extending above the frame, a cross member connecting the uprights above the frame, additional frames arranged on each side of said uprights, said additional frames each comprising uprights pivotally mounted at their lower ends adjacent the base of the frame and cross bars connecting the uprights of the several frames, a flexible member secured intermediate its ends to the supplemental frame above the rigid frame and by its ends to the cross bars of the additional frames whereby when said supplemental frame is swung about its pivots, the flexible member will be moved from one side to the other side of the rigid frame and correspondingly swing said additional frames about their pivots, and means for maintaining said supplemental frame against movement about its pivot.

13. A lawn canopy embodying a rigid frame, uprights pivotally mounted by their lower ends on opposite sides of the frame, a flexible member extending across and being detected from the top of said frame and secured at its ends to the respective said uprights whereby the said member may be moved across the top of said frame substantially to one side or the other of the frame, means mounting said uprights and flexible member for adjustment in a vertical plane with respect to said frame, said uprights being individually or collectively foldable against said frame, and means for maintaining said uprights in folded position with respect to the frame.

14. A lawn canopy embodying a rigid frame, uprights pivotally mounted by their lower ends on opposite sides of the frame, a flexible member extending across and being detached from the top of said frame and secured at its ends to the respective said uprights whereby the said member may be moved across the top of said frame substantially to one side or the other of the frame, and means separate from said uprights for locking said flexible member against movement across the top of said frame, said uprights being individually or collectively foldable against said frame.

15. A lawn canopy embodying a rigid upright frame, a supplemental frame comprising uprights pivotally mounted at their lower ends adjacent the base of the first said frame, said uprights extending above the frame, a cross member connecting the uprights above the frame, additional frames arranged on each side of said uprights, said additional frames each comprising uprights pivotally mounted at their lower ends adjacent the base of the frame and cross bars connecting the uprights of the several frames, and a flexible member secured intermediate its ends to the supplemental frame above the rigid frame and by its ends to the cross bars of the additional frames whereby when said supplemental frame is swung about its pivots, the flexible member will be moved from one side to the other side of the rigid frame and correspondingly swing said additional frames about their pivots.

17. A lawn canopy embodying a rigid upright frame, a supplemental frame comprising uprights pivotally mounted at their lower ends adjacent the base of the first said frame, said uprights extending above the frame, a cross member connecting the uprights above the frame, additional frames arranged on each side of said uprights, said additional frames each comprising uprights pivotally mounted at their lower ends adjacent the base of the frame and cross bars connecting the respective uprights, and a flexible member secured intermediate its ends to the supplemental frame above the rigid frame and by its ends to the cross bars of the additional frames whereby when said supplemental frame is swung about its pivots, the flexible member wil be moved from one side to the other side of the rigid frame and correspondingly swing said additional frames about their pivots, the connections between the uprights of the said additional frames with the respective cross bars being maintained loose whereby one of the uprights of the said additional frame will be free to move about its pivot independently with respect to the movement of the other upright of the same frame about its pivot under the action of wind upon the said flexible member.

CHARLES X. MARSHALL.